United States Patent [19]

Jarrett

[11] Patent Number: 5,593,952

[45] Date of Patent: Jan. 14, 1997

[54] AMPHOTERIC ACETATES AND GLYCINATES AS SHALE STABILIZING SURFACTANTS FOR AQUEOUS WELL FLUIDS

[75] Inventor: Michael Jarrett, Houston, Tex.

[73] Assignee: Baker Hughes Incorporated, Houston, Tex.

[21] Appl. No.: 421,373

[22] Filed: Apr. 12, 1995

[51] Int. Cl.$^6$ ........................................ B01F 17/42
[52] U.S. Cl. ........................ 507/131; 507/129; 507/241; 507/246; 507/244; 507/133
[58] Field of Search ................................. 507/131

[56] References Cited

U.S. PATENT DOCUMENTS 3,642,623  2/1972  Bennett et al. ............... 507/131 X

*Primary Examiner*—David B. Springer
*Attorney, Agent, or Firm*—Madan & Morris, PLLC

[57] ABSTRACT

The present invention provides amphoteric acetates, diacetates, and glycinates which may be added to drilling fluids in order to minimize hydration and prevent erosion loss of water-sensitive shale substrates.

13 Claims, No Drawings

AMPHOTERIC ACETATES AND GLYCINATES AS SHALE STABILIZING SURFACTANTS FOR AQUEOUS WELL FLUIDS

FIELD OF THE INVENTION

The present invention is directed to methods for treating drilling fluids to enhance the rate of penetration of the drill bit into water-sensitive clayey shale, and to minimize or eliminate shale destabilization, bit-bailing, torque, and differential sticking when drilling through such shale. In a preferred embodiment, an amphoteric acetate, diacetate, or glycinate is added to the drilling fluid, preferably in conjunction with an anti-foaming composition, such as a glycol.

BACKGROUND OF THE INVENTION

Because of environmental concerns, oil-based drilling fluids are less favored than aqueous-based drilling fluids. One problem arises when aqueous-base drilling fluids are used to drill through certain types of shale. Certain water-sensitive clayey shales tend to hydrate very easily. When contacted with an aqueous-based drilling fluid, such shales tend to swell or disperse, creating resistance to bit penetration and fouling of the drilling fluid by the dispersed shale.

Aqueous-based drilling fluids that would not hydrate water-sensitive shales would be highly desirable.

SUMMARY OF THE INVENTION

The present invention provides amphoteric acetates, diacetates, and glycinates which may be added to aqueous drilling fluids in order to minimize shale hydration and to prevent erosion loss of water-sensitive shale substrates.

DETAILED DESCRIPTION OF THE INVENTION

The present invention involves treating an aqueous-base drilling fluid with a surfactant to induce charge neutralization at the surface of any shale encountered during drilling. The surfactant provides a relatively "hydrophobic" film barrier which minimizes hydration of the shale by water in the drilling fluid. The result is to render the shale more stable and the drilling fluid less susceptible to solids contamination.

The surfactants of the present invention are amphoteric acetates, diacetates, and glycinates having the following general formula:

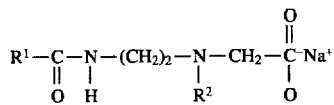

wherein R is selected from the group consisting of alkyl and alkenyl groups having between about 1–18 carbon atoms; and, $R^2$ is selected from the group consisting of ethanol and a substituent having the following general formula:

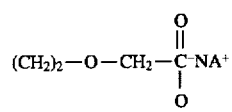

Suitable surfactants include: capryloamphoglycinate; cocoamphodiacetate; disodium cocoamphodiacetate; lauroamphoacetate; sodium capryloamphohydroxy-propyl sulfonate; sodium mixed C8 amphocarboxylate; and, alkylamphohydroxypropyl sulfonate. Foaming has been noted using these surfactants, a result that is undesirable when using an aqueous-base drilling fluid. It is believed that foaming may be counteracted to some extent using anti-foaming compositions. An example of a known anti-foaming agent is a glycol, such as AQUACOL, available from Baker-Hughes Incorporated, Houston, Tex. A preferred embodiment involves treating a drilling fluid with both a glycol and an amphoteric acetate, diacetate, or glycinate.

The amphoteric acetates, diacetates, and glycinates of the present invention preferably are added to the aqueous-base drilling fluid at a concentration of about 2 wt %, although a concentration of 1 wt % also appears to be sufficient to minimize shale erosion loss. These surfactants should reduce erosion loss by at least about 10–15%, preferably by at least about 20%, and most preferably by about 40–50%. The less the erosion loss, the more cost efficient the use of the surfactant.

The invention will be more clearly understood with reference to the following examples. In the following Tables, NEWDRILL, MIL-PAC, BIODRILL, and BIOLOSE are products which may be obtained from Baker Hughes Inteq, Houston, Tex. The following are products which may be obtained from the following companies: REV-DUST, Mil-White, Houston, Tex.; BIOZAN, a whelan gum obtained from Kelco Rotary, San Diego, Calif.; LUVISKOL, a polyvinyl pyrrolidone obtained from BASF Chemical Co., Dusseldorf, Germany; AIRVOL, a polyvinyl alcohol available from Air Products and Chemicals, Inc., Philadelphia, Pa.; XCD POLYMER, xanthan gum, Kelco Rotary, San Diego, Calif.; REWOTERIC AM V (capryloamphoglycinate), Witco Chemical Co., Janesville, Wis.; MONATERIC CDX-38 (cocoamphodiacetate), MONATERIC CLV (disodium cocoamphodiacetate), and MONATERIC LM-M30 (lauroamphoacetate), Mona Industries, Patterson, N.J.; MIRANOL JS CONC (sodium capryloamphohydroxy-propyl sulfonate), MIRANOL JEM CONC (sodium mixed C8 amphocarboxylate), and, DV #4183-100ER (alkylamphohydroxypropyl sulfonate), Rhone Poulenc, Cranbury, N.J.

EXPERIMENTAL PROCEDURES

The "Rolling Dispersion" Test

In the following examples, the effectiveness of the amphoteric acetates, diacetates, or glycinates was tested by simulating erosion loss using a "rolling dispersion" test. Basically, 25 g of raw bentonite commercially available as ⅜" chunks was added to a base drilling fluid. The bentonite used in the following examples was HOLE-PLUG, obtained from Baroid Drilling Fluids, Houston, Tex. The drilling fluid/bentonite mixture was rolled for sixteen hours at the given temperature, sieved through 18 mesh screen, and the rheologic properties and fluid loss of the resulting mud were measured. The HOLE-PLUG was retained on an 18 mesh screen, washed, dried, and then reweighed to determine erosion loss.

The amount of bentonite in the drilling fluid simulates the drill cuttings that can be expected from a shale formation when the particular drilling fluid is used. The lower the erosion loss, the lower the solids content, and the more effective the surfactant in protecting the stability of the bentonite. Generally, effectiveness in protecting the bentonite should translate into effectiveness in protecting shale.

Any other procedures used in the following experiments are standard API Procedures.

EXAMPLE 1

In this example, the rolling dispersion test was performed using several seawater-based drilling fluids with and without REWOTERIC AM V (caprylo-amphoglycinate) to determine the effect of this surfactant on erosion loss. API Procedure Codes RP 10B and 13B were used to determine the specifics for the various drilling fluids, and the resulting effects on rheological properties, fluid loss, and erosion loss, are given in Table 1:

EXAMPLE 2

In this example, the rolling dispersion test was performed on several seawater-based drilling fluids at lower dynamic temperatures with and without REWOTERIC AM V. API Procedure Codes RP 10B and 13B were used to determine the specifics for the various drilling fluids, and the resulting effects on rheological properties, fluid loss, and erosion loss, are given in Table 2:

TABLE 1

Witco REWOTERIC AM V

| Materials: | | | | | | | | |
|---|---|---|---|---|---|---|---|---|
| Seawater, bbl | 0.86 | 0.86 | 0.86 | 0.86 | 0.86 | 0.86 | 0.86 | 0.86 |
| LUVISKOL K-90, lb | 2.0 | 2.0 | | | | | | |
| AIRVOL 540S (20%), lb | | | 10 | 10 | | | | |
| NEWDRILL PLUS, lb | | | | | 2.0 | 2.0 | | |
| Caustic, lb | 0.5 | 0.5 | 0.5 | 0.5 | 0.5 | 0.5 | 0.5 | 0.5 |
| MIL-PAC LV, lb | 2.0 | 2.0 | 2.0 | 2.0 | 2.0 | 2.0 | 2.0 | 2.0 |
| BIOZAN, lb | 0.7 | 0.7 | 0.7 | 0.7 | 0.7 | 0.7 | 0.7 | 0.7 |
| REWOTERIC AM V, lb | | 7.0 | | 7.0 | | 7.0 | | 7.0 |
| Barite, lb | 204 | 204 | 204 | 204 | 204 | 204 | 204 | 204 |
| Stirred 45 min | | | | | | | | |
| Add 25 g HOLE-PLUG | | | | | | | | |
| Rolled 16 hr, 250° F. | | | | | | | | |
| Properties: | | | | | | | | |
| Plastic Viscosity, cp | 24 | 28 | 24 | 25 | 26 | 24 | 17 | 14 |
| Yield Point, lb/100 sq ft | 17 | 23 | 22 | 22 | 30 | 22 | 19 | 17 |
| 10-sec Gel, lb/100 sq ft | 5 | 6 | 6 | 7 | 6 | 5 | 4 | 4 |
| 10-min Gel, lb/100 sq ft | 6 | 8 | 8 | 9 | 9 | 7 | 6 | 6 |
| API Filtrate, ml | 14.6 | 14.4 | 8.6 | 24 | 4.0 | 4.2 | 60 | 36 |
| HOLE-PLUG, g (after wash & dry) | 22.4 | 22.6 | 15.6 | 22.4 | 17.3 | 19.0 | 7.2 | 17.6 |
| Erosion Loss, % | 3.5 | 0.1 | 31.6 | 3.5 | 24.1 | 5.3 | 68.4 | 22.8 |

Note: erosion lossses calculated on basis of initial 8.8% moisture content.

REWOTERIC AM V effectively reduced erosion loss, and should be an effective surfactant for use in protecting shale substrates from hydration by aqueous-base drilling fluids. Some foaming was noted.

TABLE 2

Witco REWOTEPIC AM V
(tested at lower dynamic temperature)

| Materials: | | | | | | | | |
|---|---|---|---|---|---|---|---|---|
| Seawater, bbl | 0.86 | 0.86 | 0.86 | 0.86 | 0.86 | 0.86 | 0.86 | 0.86 |
| LUVISKOL K-90, lb | 2.0 | 2.0 | | | | | | |
| AIRVOL 540S (20%), lb | | | 10 | 10 | | | | |
| NEWDRILL PLUS, lb | | | | | 2.0 | 2.0 | | |
| Caustic, lb | 0.5 | 0.5 | 0.5 | 0.5 | 0.5 | 0.5 | 0.5 | 0.5 |
| MIL-PAC LV, lb | 2.0 | 2.0 | 2.0 | 2.0 | 2.0 | 2.0 | 2.0 | 2.0 |
| BIOZAN, lb | 0.7 | 0.7 | 0.7 | 0.7 | 0.7 | 0.7 | 0.7 | 0.7 |
| REWOTERIC AM V, lb | | 7.0 | | 7.0 | | 7.0 | | 7.0 |
| Barite, lb | 204 | 204 | 204 | 204 | 204 | 204 | 204 | 204 |
| Stirred 45 min | | | | | | | | |
| Add 25 g HOLE-PLUG | | | | | | | | |
| Rolled 16 hr, 200° F. | | | | | | | | |
| Properties: | | | | | | | | |
| Plastic Viscosity, cp | 23 | 25 | 21 | 22 | 22 | 21 | 14 | 13 |
| Yield Point, lb/100 sq ft | 27 | 30 | 29 | 29 | 25 | 28 | 28 | 27 |
| 10-sec Gel, lb/100 sq ft | 6 | 7 | 7 | 7 | 5 | 5 | 7 | 7 |
| 10-min Gel, lb/100 sq ft | 9 | 10 | 10 | 11 | 8 | 8 | 10 | 10 |
| API Filtrate, ml | 13 | 14 | 16 | 22 | 4.4 | 4.6 | 24 | 20 |
| HOLE-PLUG, g (after wash & dry) | 22.0 | 22.2 | 20.0 | 22.4 | 15.3 | 20.8 | 8.5 | 18.0 |
| Erosion Loss, % | 3.5 | 2.6 | 12.3 | 1.7 | 32.9 | 8.8 | 62.7 | 21.0 |

Note: erosion losses calculated on basis of initial 8.8% moisture content.

REWOTERIC AM V again effectively reduced erosion loss, and should be an effective surfactant for use in protecting shale substrates from hydration by aqueous-base drilling fluids. Some foaming was noted.

EXAMPLE 3

In this example, the rolling dispersion test was performed using several seawater-based drilling fluids with and without MONATERIC CDX-38 (cocoamphodiacetate) to determine erosion loss. API Procedure Codes RP 10B and 13B were used to determine the specifics for the various drilling fluids, and the resulting effects on rheological properties, fluid loss, and erosion loss, are given in Table 3:

EXAMPLE 4

In this example, the rolling dispersion test was performed using water-based drilling fluids with and without MONATERIC CLV to determine erosion loss. API Procedure Codes RP 10B and 13B were used to determine the specifics for the various drilling fluids, and the resulting effects on rheological properties, fluid loss, and erosion loss, are given in Table 4:

TABLE 3

Mona Industries MONATERIC CDX-38

| Materials: | | | | | | | | |
|---|---|---|---|---|---|---|---|---|
| Seawater, bbl | 0.86 | 0.86 | 0.86 | 0.86 | 0.86 | 0.86 | 0.86 | 0.86 |
| LUVISKOL K-90, lb | 2.0 | 2.0 | | | | | | |
| AIRVOL 540S (20%), lb | | | 10 | 10 | | | | |
| NEWDRILL PLUS, lb | | | | | 2.0 | 2.0 | | |
| Caustic, lb | 0.5 | 0.5 | 0.5 | 0.5 | 0.5 | 0.5 | 0.5 | 0.5 |
| MIL-PAC LV, lb | 2.0 | 2.0 | 2.0 | 2.0 | 2.0 | 2.0 | 2.0 | 2.0 |
| BIOZAN, lb | 0.7 | 0.7 | 0.7 | 0.7 | 0.7 | 0.7 | 0.7 | 0.7 |
| MONATERIC CDX-38, lb | | 7.0 | | 7.0 | | 7.0 | | 7.0 |
| Barite, lb | 204 | 204 | 204 | 204 | 204 | 204 | 204 | 204 |
| Stirred 45 min | | | | | | | | |
| Add 25 g HOLE-PLUG | | | | | | | | |
| Rolled 16 hr, 250° F. | | | | | | | | |
| Properties: | | | | | | | | |
| Plastic Viscosity, cp | 23 | 25 | 25 | 16 | 27 | 23 | 22 | 17 |
| Yield Point, lb/100 sq ft | 20 | 23 | 22 | 17 | 28 | 18 | 25 | 20 |
| 10-sec Gel, lb/100 sq ft | 5 | 5 | 5 | 3 | 5 | 3 | 7 | 4 |
| 10-min Gel, lb/100 sq ft | 7 | 7 | 7 | 5 | 8 | 5 | 9 | 6 |
| API Filtrate, ml | 6.8 | 12 | 6.0 | 38 | 4.0 | 5.6 | 6.4 | 5.8 |
| HOLE-PLUG, g (after wash & dry) | 19.2 | 19.7 | 18.2 | 19.8 | 13.4 | 18.1 | 13.4 | 17.2 |
| Erosion Loss, % | 15.8 | 13.6 | 20.2 | 13.2 | 41.2 | 20.6 | 41.2 | 24.6 |

Note: erosion losses calculated on basis of initial 8.8% moisture content.

MONATERIC CDX-38 was effective to reduce erosion loss using these drilling fluids. Some foaming was noted.

TABLE 4

Mona Industries MONATERIC CLV

| Materials: | | | | | | | | |
|---|---|---|---|---|---|---|---|---|
| Seawater, bbl | 0.86 | 0.86 | 0.86 | 0.86 | 0.86 | 0.86 | 0.86 | 0.86 |
| LUVISKOL K-90, lb | 2.0 | 2.0 | | | | | | |
| AIRVOL 540S (20%), lb | | | 10 | 10 | | | | |
| NEWDRILL PLUS, lb | | | | | 2.0 | 2.0 | | |
| Caustic, lb | 0.5 | 0.5 | 0.5 | 0.5 | 0.5 | 0.5 | 0.5 | 0.5 |
| MIL-PAC LV, lb | 2.0 | 2.0 | 2.0 | 2.0 | 2.0 | 2.0 | 2.0 | 2.0 |
| BIOZAN, lb | 0.7 | 0.7 | 0.7 | 0.7 | 0.7 | 0.7 | 0.7 | 0.7 |
| MONATERIC CLV, lb | | 7.0 | | 7.0 | | 7.0 | | 7.0 |
| Barite, lb | 204 | 204 | 204 | 204 | 204 | 204 | 204 | 204 |
| Stirred 45 min | | | | | | | | |
| Add 25 g HOLE-PLUG | | | | | | | | |
| Rolled 16 hr, 250° F. | | | | | | | | |
| Properties: | | | | | | | | |
| Plastic Viscosity, cp | 22 | 23 | 17 | 16 | 25 | 24 | 15 | 16 |
| Yield Point, lb/100 sq ft | 21 | 18 | 22 | 17 | 25 | 21 | 13 | 18 |
| 10-sec Gel, lb/100 sq ft | 5 | 4 | 5 | 4 | 6 | 4 | 3 | 3 |
| 10-min Gel, lb/100 sq ft | 6 | 5 | 6 | 5 | 8 | 5 | 5 | 5 |
| API Filtrate, ml | 3.0 | 3.8 | 6.0 | >50 | 6.8 | 12 | 10 | >50 |
| HOLE-PLUG, g | 21.1 | 19.5 | 18.7 | 15.8 | 16.5 | 17.6 | 10.6 | 13.4 |

TABLE 4-continued

| Mona Industries MONATERIC CLV | | | | | | | | |
|---|---|---|---|---|---|---|---|---|
| (after wash & dry) Erosion Loss, % | 7.5 | 14.5 | 18.0 | 30.1 | 27.6 | 22.8 | 53.5 | 41.2 |

Note: erosion losses calculated on basis of initial 8.8% moisture content.

MONATERIC CLV was effective to reduce erosion loss using these drilling fluids. Some foaming was noted.

EXAMPLE 5

In this example, the rolling dispersion test was performed using seawater-base drilling fluids with and without MONATERIC LM-M30 (lauroamphoacetate) to determine erosion loss. API Procedure Codes RP 10B and 13B were used to determine the specifics for the various drilling fluids, and the resulting effects on rheological properties, fluid loss, and erosion loss, are given in Table 5:

EXAMPLE 6

In this example, the rolling dispersion test was performed using several freshwater and seawater-based drilling fluids with and without MIRANOL JS CONC (sodium caprylo-amphohydroxypropyl sulfonate) to determine erosion loss. API Procedure Codes RP 10B and 13B were used to determine the specifics for the various drilling fluids, and the resulting effects on rheological properties, fluid loss, and erosion loss, are given in Table 6:

TABLE 5

| Mona Industries MONATERIC LM-M30 | | | | | | | | |
|---|---|---|---|---|---|---|---|---|
| Materials: | | | | | | | | |
| Seawater, bbl | 0.86 | 0.86 | 0.86 | 0.86 | 0.86 | 0.86 | 0.86 | 0.86 |
| LUVISKOL K-90, lb | 2.0 | 2.0 | | | | | | |
| AIRVOL 540S (20%), lb | | | 10 | 10 | | | | |
| NEWDRILL PLUS, lb | | | | | 2.0 | 2.0 | | |
| Caustic, lb | 0.5 | 0.5 | 0.5 | 0.5 | 0.5 | 0.5 | 0.5 | 0.5 |
| MIL-PAC LV, lb | 2.0 | 2.0 | 2.0 | 2.0 | 2.0 | 2.0 | 2.0 | 2.0 |
| BIOZAN, lb | 0.7 | 0.7 | 0.7 | 0.7 | 0.7 | 0.7 | 0.7 | 0.7 |
| MONATERIC LM-M30, lb | | 7.0 | | 7.0 | | 7.0 | | 7.0 |
| Barite, lb | 204 | 204 | 204 | 204 | 204 | 204 | 204 | 204 |
| Stirred 45 min | | | | | | | | |
| Add 25 g HOLE-PLUG | | | | | | | | |
| Rolled 16 hr, 200° F. | | | | | | | | |
| Properties: | | | | | | | | |
| Plastic Viscosity, cp | 24 | 26 | 19 | 21 | 22 | 22 | 18 | 17 |
| Yield Point, lb/100 sq ft | 24 | 30 | 28 | 30 | 24 | 26 | 25 | 27 |
| 10-sec Gel, lb/100 sq ft | 7 | 8 | 8 | 8 | 5 | 5 | 8 | 8 |
| 10-min Gel, lb/100 sq ft | 10 | 11 | 11 | 10 | 7 | 8 | 11 | 11 |
| API Filtrate, ml | 8.0 | 6.4 | 7.6 | 5.6 | 3.6 | 3.8 | 24 | 18 |
| HOLE-PLUG, g | 22.0 | 23.0 | 20.0 | 21.4 | 17.0 | 18.1 | 8.8 | 17.1 |
| (after wash & dry) | | | | | | | | |
| Erosion Loss, % | 3.5 | 0 | 12.2 | 6.1 | 25.4 | 20.6 | 61.4 | 25.0 |

Note: erosion losses calculated on basis of initial 8.8% moisture content.

MONATERIC LM-M30 was effective to reduce erosion loss using these drilling fluids. Some foaming was noted.

TABLE 6

| Rhone-Poulenc MIRANOL JS CONC | | | | | | | | |
|---|---|---|---|---|---|---|---|---|
| Materials: | | | | | | | | |
| Freshwater, bbl | 1.0 | 1.0 | | | | | | |
| Seawater, bbl | | | 1.0 | 1.0 | | | 1.0 | 1.0 |
| 3% KCl Water, bbl | | | | | 1.0 | 1.0 | | |
| Caustic, lb | 0.2 | 0.2 | 0.5 | 0.5 | 0.4 | 0.4 | 0.5 | 0.5 |
| NEWDRILL PLUS, lb | 1.0 | 1.0 | 1.0 | 1.0 | 1.0 | 1.0 | | |
| MIL-PAC LV, lb | 1.0 | 1.0 | 1.0 | 1.0 | 1.0 | 1.0 | 1.0 | 1.0 |
| XCD Polymer, lb | 0.2 | 0.2 | 0.7 | 0.7 | 0.7 | 0.7 | 1.0 | 1.0 |
| MIRANOL JS CONC, lb | | 7.0 | | 7.0 | | 7.0 | | 7.0 |
| Stirred 45 min | | | | | | | | |
| Add 25 g HOLE-PLUG | | | | | | | | |
| Rolled 16 hr, 200° F. | | | | | | | | |

TABLE 6-continued

Rhone-Poulenc MIRANOL JS CONC

| Properties: | | | | | | | | |
|---|---|---|---|---|---|---|---|---|
| Plastic Viscosity, cp | 45 | 30 | 12 | 10 | 10 | 8 | 8 | 6 |
| Yield Point, lb/100 sq ft | 35 | 16 | 13 | 10 | 10 | 9 | 12 | 12 |
| HOLE-PLUG, g (after wash & dry) | 6.9 | 7.6 | 12.7 | 17.4 | 18.6 | 19.7 | 5.6 | 9.8 |
| Erosion Loss, % | 69.7 | 66.6 | 44.3 | 23.7 | 18.4 | 13.6 | 75.4 | 57.0 |
| Improvement, %, as compared to the control | | 4.5 | | 46.5 | | 26.1 | | 24.4 |

Note: erosion losses calculated on basis of initial 8.8% moisture content.

MIRANOL JS CONC was effective to reduce erosion loss using these drilling fluids. Some foaming was noted.

EXAMPLE 7

In this example, the rolling dispersion test was performed using several freshwater and seawater-base drilling fluids with and without MIRANOL JEM CONC (sodium mixed C8 amphocarboxylate) to determine erosion loss. API Procedure Codes RP 10B and 13B were used to determine the specifics for the various drilling fluids, and the resulting effects on rheological properties, fluid loss, and erosion loss, are given in Table 7:

TABLE 7

Rhone-Poulenc Miranol JEM CONC

| Materials: | | | | | | | | |
|---|---|---|---|---|---|---|---|---|
| Freshwater, bbl | 1.0 | 1.0 | | | | | | |
| Seawater, bbl | | | 1.0 | 1.0 | | | 1.0 | 1.0 |
| 3% KCl Water, bbl | | | | | 1.0 | 1.0 | | |
| Caustic, lb | 0.2 | 0.2 | 0.5 | 0.5 | 0.4 | 0.4 | 0.5 | 0.5 |
| NEWDRILL PLUS, lb | 1.0 | 1.0 | 1.0 | 1.0 | 1.0 | 1.0 | | |
| MIL-PAC LV, lb | 1.0 | 1.0 | 1.0 | 1.0 | 1.0 | 1.0 | 1.0 | 1.0 |
| XCD Polymer, lb | 0.2 | 0.2 | 0.7 | 0.7 | 0.7 | 0.7 | 1.0 | 1.0 |
| MIRANOL JEM CONC, lb | | 7.0 | | 7.0 | | 7.0 | | 7.0 |
| Stirred 45 min Add 25 g HOLE-PLUG Rolled 16 hr, 200° F. | | | | | | | | |
| Properties: | | | | | | | | |
| Plastic Viscosity, cp | 47 | 44 | 13 | 11 | 10 | 11 | 8 | 6 |
| Yield Point, lb/100 sq ft | 41 | 19 | 12 | 12 | 13 | 14 | 11 | 12 |
| HOLE-PLUG, g (after wash & dry) | 7.0 | 6.9 | 15.4 | 22.0 | 19.3 | 19.4 | 4.2 | 14.4 |
| Erosion Loss, % | 69.0 | 70.0 | 32.0 | 4.0 | 15.0 | 15.0 | 82.0 | 37.0 |
| Improvement, %, as compared to the control | | −1.0 | | 88.0 | | 0 | | 55.0 |

Note: erosion losses calculated on basis of initial 8.8% moisture content.

MIRANOL JEM CONC was effective to reduce erosion loss using these drilling fluids. Some foaming was noted.

EXAMPLE 8

In this example, the rolling dispersion test was performed using several freshwater and seawater-base drilling fluids with and without DV #4183-100ER (alkylamphohydroxypropyl sulfonate) to determine erosion loss. API Procedure Codes RP 10B and 13B were used to determine the specifics for the various drilling fluids, and the resulting effects on rheological properties, fluid loss, and erosion loss, are given in Table 8:

TABLE 8

Rhone-Poulenc DV #4183-100ER

| Materials: | | | | | | | | |
|---|---|---|---|---|---|---|---|---|
| Freshwater, bbl | 1.0 | 1.0 | | | | | | |
| Seawater, bbl | | | 1.0 | 1.0 | | | 1.0 | 1.0 |
| 3% KCl Water, bbl | | | | | 1.0 | 1.0 | | |
| Caustic, lb | 0.2 | 0.2 | 0.5 | 0.5 | 0.4 | 0.4 | 0.5 | 0.5 |
| NEWDRILL PLUS, lb | 1.0 | 1.0 | 1.0 | 1.0 | 1.0 | 1.0 | | |
| MIL-PAC LV, lb | 1.0 | 1.0 | 1.0 | 1.0 | 1.0 | 1.0 | 1.0 | 1.0 |

TABLE 8-continued

| | Rhone-Poulenc DV #4183-100ER | | | | | | | |
|---|---|---|---|---|---|---|---|---|
| XCD Polymer, lb | 0.2 | 0.2 | 0.7 | 0.7 | 0.7 | 0.7 | 1.0 | 1.0 |
| DV #4183-100ER, lb | | 7.0 | | 7.0 | | 7.0 | | 7.0 |
| Stirred 45 min | | | | | | | | |
| Add 25 g HOLE-PLUG | | | | | | | | |
| Rolled 16 hr, 200° F. | | | | | | | | |
| Properties: | | | | | | | | |
| Plastic Viscosity, cp | 50 | 55 | 14 | 11 | 10 | 8 | 6 | 7 |
| Yield Point, lb/100 sq ft | 41 | 28 | 13 | 14 | 11 | 10 | 11 | 11 |
| HOLE-PLUG, g | 6.9 | 5.7 | 15.5 | 17.4 | 19.1 | 20.0 | 4.5 | 13.2 |
| (after wash & dry) | | | | | | | | |
| Erosion Loss, % | 69.7 | 75.0 | 32.0 | 23.7 | 16.2 | 12.3 | 80.3 | 42.1 |
| Improvement, %, as compared to the control | | 23.2 | | 25.9 | | 24.7 | | 47.6 |

Note: erosion losses calculated on basis of initial 8.8% moisture content.

DV #4183-100ER was effective to reduce erosion loss using these drilling fluids. Some foaming was noted.

Persons of skill in the art will appreciate that many modifications may be made to the embodiments described herein without departing from the spirit of the present invention. Accordingly, the embodiments described herein are illustrative only and are not intended to limit the scope of the present invention.

I claim:

1. A method for minimizing hydration and preventing erosion loss of water-sensitive shale substrates by aqueous-base drilling fluids comprising the step of treating an aqueous-base drilling fluid with an effective amount of an amphoteric surfactant selected from the group consisting of acetates, diacetates, and glycinates.

2. A method for minimizing hydration and preventing erosion loss of water-sensitive shale substrates by water-base drilling fluids comprising the step of treating an aqueous drilling fluid with an effective amount of an amphoteric surfactant selected from the group consisting of capryloamphoglycinate; cocoamphodiacetate; disodium cocoamphodiacetate; lauroamphoacetate; sodium capryloamphohydroxypropyl sulfonate; sodium mixed C8 amphocarboxylate; and, alkylamphohydroxypropyl sulfonate.

3. A method for minimizing hydration and preventing erosion loss of water-sensitive shale substrates by water-base drilling fluids comprising the step of treating an aqueous drilling fluid with an effective amount of an amphoteric surfactant comprising the following general structure:

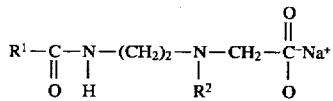

wherein

R$^1$ is selected from the group consisting of alkyl and alkenyl groups having between about 1–18 carbon atoms; and R$^2$ is selected from the group consisting of —CH$_2$—CH$_2$—OH and —(CH$_2$)$_2$—O—CH$_2$CO$_2$$^-$Na$^+$.

4. A method for minimizing hydration and preventing erosion loss of water-sensitive shale substrates by aqueous-base drilling fluids comprising the steps of treating an aqueous-base drilling fluid with an effective amount of an amphoteric surfactant selected from the group consisting of acetates, diacetates, and glycinates; and a glycol.

5. The method of claim 2 further comprising the step of treating said aqueous-base drilling fluid with an a glycol.

6. The method of claim 3 further comprising the step of treating said aqueous-base drilling fluid with an a glycol.

7. The method of claim 1 wherein said effective amount of said surfactant comprises at least about 1 wt %.

8. The method of claim 2 wherein said effective amount of said surfactant comprises at least about 1 wt %.

9. The method of claim 3 wherein said effective amount of said surfactant comprises at least about 1 wt %.

10. The method of claim 4 wherein said effective amount of said surfactant comprises at least about 1 wt %.

11. An aqueous-base drilling fluid comprising an amphoteric surfactant selected from the group consisting of acetates, diacetates, and glycinates.

12. An aqueous-base drilling fluid comprising an amphoteric surfactant selected from the group consisting of capryloamphoglycinate; cocoamphodiacetate; disodium cocoamphodiacetate; lauroamphoacetate; sodium capryloamphohydroxypropyl sulfonate; sodium mixed C8 amphocarboxylate; and, alkylamphohydroxypropyl sulfonate.

13. An aqueous-base drilling fluid comprising an amphoteric surfactant comprising the following general structure:

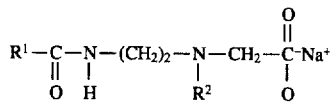

wherein

R$^1$ is selected from the group consisting of alkyl and alkenyl groups having between about 1–18 carbon atoms; and, R$^2$ is selected from the group consisting of —CH$_2$—CH$_2$—OH and —(CH$_2$)$_2$—O—CH$_2$—CO$_2$$^-$Na$^+$.

* * * * *